April 20, 1954     C. N. HOUSH ET AL     2,676,033
RETRACTABLE TRAILER CONNECTING MEANS
Filed June 15, 1951     2 Sheets-Sheet 1
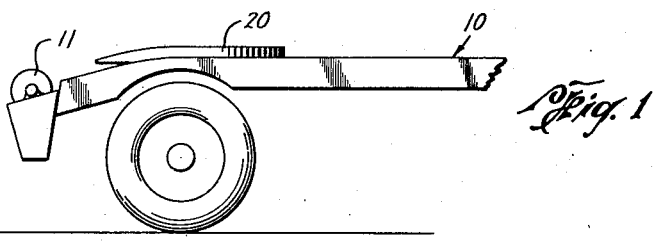
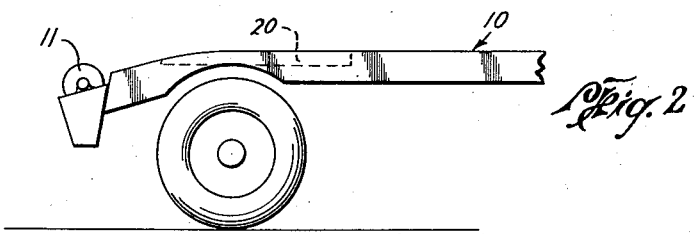
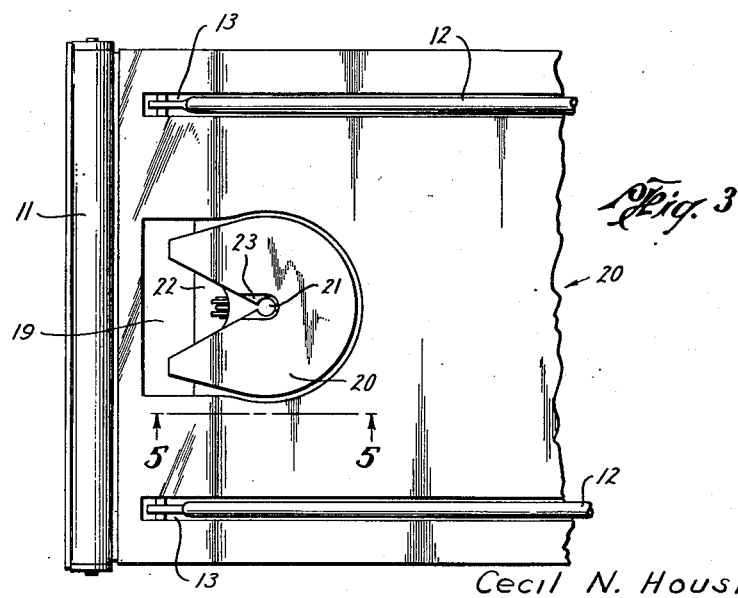
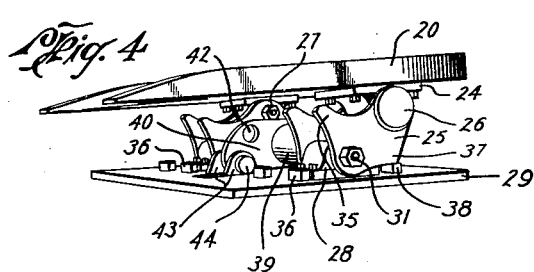
Cecil N. Housh
Alces Paul Robishaw
O'Grady Ferguson Fair
Norman H. Mansfield
INVENTORS
BY Browning & Simms
ATTORNEYS

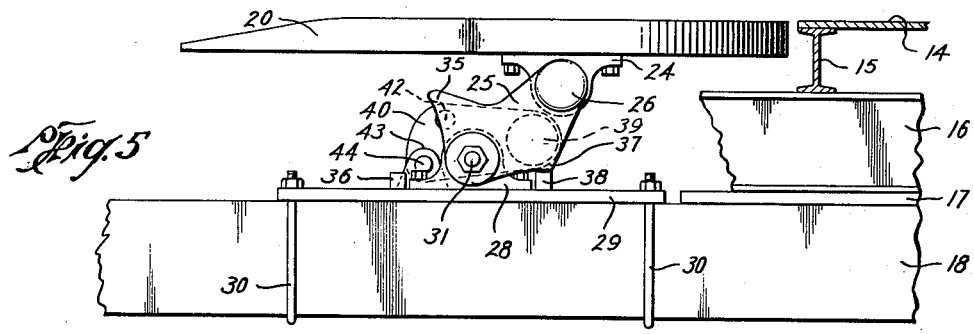
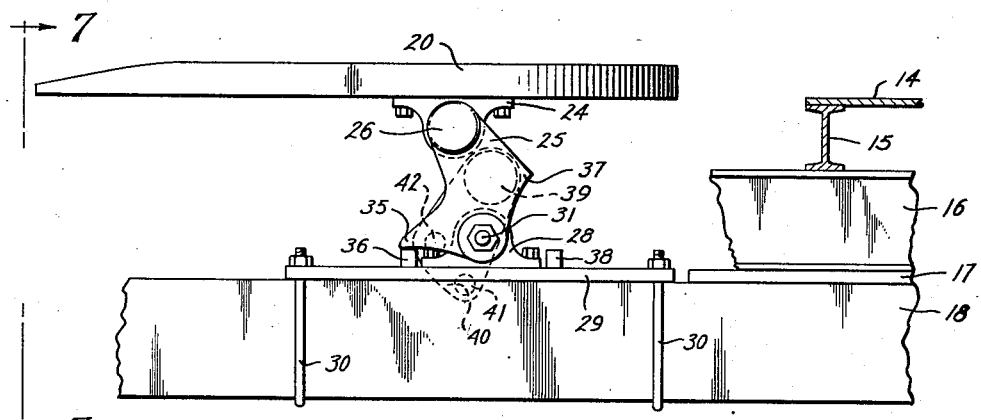
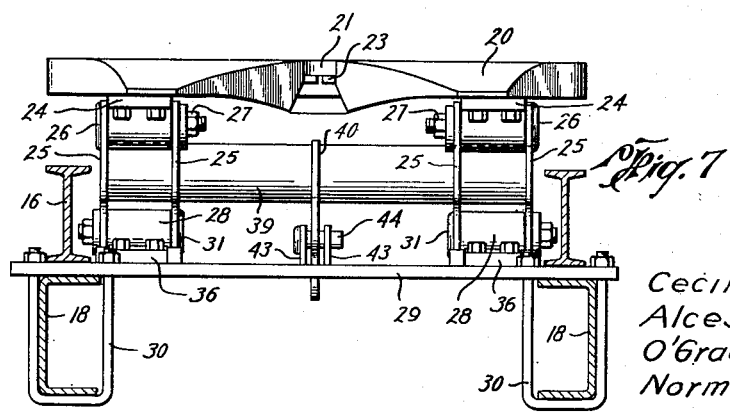
Cecil N. Housh
Alces Paul Robishaw
O'Grady Ferguson Fair
Norman H. Mansfield
INVENTORS
BY Browning & Simmons
ATTORNEYS Patented Apr. 20, 1954

2,676,033

UNITED STATES PATENT OFFICE 2,676,033

RETRACTABLE TRAILER CONNECTING MEANS

Cecil N. Housh, Alces Paul Robishaw, O'Grady Ferguson Fair, and Norman H. Mansfield, Houston, Tex.; said Robishaw, said Fair, and said Mansfield assignors to C. N. Housh, Houston, Tex.

Application June 15, 1951, Serial No. 231,746

5 Claims. (Cl. 280—438)

This invention relates to an apparatus for connecting a trailer to a tractor. In one of its aspects, it relates to a retractable trailer connecting means. In another of its aspects, it relates to a fifth wheel adapted to be mounted on a tractor in such a fashion as to be raised and lowered with respect thereto.

It is conventional to provide a tractor with a trailer connecting means, such as a fifth wheel or a kingpin, upon which the front end of the trailer bears while the rear end of the trailer is supported by a rear axle and wheels. It is sometimes desirable to employ a tractor in service pulling a trailer and at other times as a truck in general "bobtail" or flat bed service. However, if a conventional tractor having a trailer connecting means mounted thereon is employed in flat bed service, the trailer connecting means extends above the bed of the tractor and will, therefore, interfere with the normal flat bed service. Accordingly, it is apparent that it would be highly desirable to possess a means for raising and lowering a trailer connecting means so that it can be positioned to be flush with the bed of a tractor and, alternatively, so that it can be raised to perform its normal function as a trailer connecting means when the tractor is desired to be employed in trailer service. In providing such a retractable trailer connecting means adapted to be employed in a conventional tractor or, more preferably, in a conventional flat bed truck, provision must be made for a very compact apparatus for elevating such connecting means inasmuch as little space is provided in the ordinary flat bed truck for receiving such apparatus. Also, the elevating apparatus must be of a stout and rugged construction and must be so designed that it can readily withstand the heavy drawbar loads exerted by large trailers.

Accordingly, it is an object of this invention to provide a trailer connecting means which can be retracted to a position flush with the bed of a tractor or a truck and, when desired, raised above said bed to be in an operative position for receiving a complementary connecting means attached to a trailer.

Another object of this invention is to provide a retractable trailer connecting means which is compact and simple in construction and yet which is sufficiently rugged to be able to withstand heavy trailer drawbar loads.

Still another object of this invention is to provide a trailer connecting means, such as a fifth wheel, which can be raised above the surface of a truck bed by means of a pivotal arrangement, said arrangement being particularly adapted to transmit the drawbar load from the connecting means to the frame of the tractor.

Yet another object of this invention is to provide a trailer connecting means, such as a fifth wheel, which is adapted to be raised with respect to the frame of a truck by means of a suitable pivotal arrangement in which is provided a means for preventing further rotation or depression of said connecting means when it is in a lowered position.

Still yet another object of this invention is to provide a trailer connecting means adapted to be raised and lowered with respect to the frame of a tractor or truck and to be locked securely in either of such positions.

Yet another object of this invention is to provide a trailer connecting means, such as a fifth wheel, which is adapted to be raised with respect to the frame of a truck by means of a suitable pivotal arrangement in which is provided a means for preventing further rotation of said connecting means when it is in a raised position; the arrangement being such that the weight of the fifth wheel and its load tends to prevent movement of the fifth wheel to its lowered position.

Other objects, advantages and features of this invention will be apparent to one skilled in the art upon a consideration of the written specification, the attached claims and the annexed drawings, wherein:

Fig. 1 represents a rearward portion of a truck with the fifth wheel shown in a raised position to receive the complementary connecting means of a trailer;

Fig. 2 is similar to Fig. 1 except that the fifth wheel is shown in a depressed position flush with the bed of the truck;

Fig. 3 is a plan view of one embodiment of the apparatus of this invention;

Fig. 4 is a perspective showing one embodiment of the apparatus of this invention;

Fig. 5 is an elevational view taken on the line 5—5 of Fig. 3 showing the apparatus of this invention in a lowered position;

Fig. 6 is similar to Fig. 5 except that the apparatus is shown in a raised position; and Fig. 7 is a rear end view taken on the line 7—7 of Fig. 6.

In the drawings, like characters of reference designate corresponding parts throughout the several views.

Referring now to the drawings, particularly to Figs. 1, 2 and 3, there is shown a truck chassis designated generally by the numeral 10. Such chassis can be equipped with a loading roller 11 and with pivotally mounted gin-poles 12 adapted to be received in openings 13 in order that they may be stored out of the way below the surface of the truck bed when not in use.

As shown more particularly in the other views, the truck chassis can be comprised of a truck bed deck 14 supported on lateral deck support beams 15. Extending longitudinally the length of the truck are truck bed beams 16 resting on plates 17. All of the aforesaid superstructure can be fastened to the truck frame which can comprise substantially parallel truck frame channel members 18 which desirably form a part of the truck chassis and can be attached to the conventional running gear.

Disposed in an opening 19 in the truck bed deck 14 and preferably near the axis of the hind wheels of the truck, is a trailer connecting means adapted to receive a complementary connecting means attached to the trailer. Such trailer connecting means can comprise a fifth wheel 20 having a central opening 21 adapted to receive and retain in pivotable relationship a kingpin attached to a trailer. Opening 21 can be rearwardly flaring as at 22 in order to facilitate connection of the kingpin of the trailer with the fifth wheel. A conventional latching means 23 is provided to retain the kingpin within the opening 21.

Attached to the fifth wheel 20, preferably at a point below its center of gravity, is a pivoting means which can be upper pintle blocks 24. Pivoting or hinging means, which can be levers or hinge plates 25, are rotatably or hingedly connected at one of their ends to upper pintle blocks 24 by means of hinge pins 26 having enlarged heads adapted to butt against the outer side of the hinge plates and bodies adapted to extend through the hinge plates and the pintle blocks and to be secured in place by nuts 27 as shown more particularly in Fig. 7. The other end of the hinge plates are hingedly or pivotally connected to the truck frame by means of lower pintle blocks 28 attached to plate 29. Additional hinge pins 31 are employed to rotatably connect hinge plates 25 to the lower pintle blocks in the same manner as the upper hinge pins 26 connect the hinge plates to the upper pintle blocks. U-bolts 30 secure the plate 29 and attached parts to frame members 18.

As shown in the drawings, the means rotatably or hingedly attached to the fifth wheel and to the truck frame, i. e., hinge plate 25, can be considered to be a form of a lever, more particularly a bell crank type lever having a laterally or rearwardly extending portion or arm 35 adapted to prevent further rotation of the fifth wheel 20 and the hinge plate 25 after it has been raised to the position shown in Fig. 6. The extended portion 35 bears against a bearing block 36 attached to plate 29 and in this manner, the drawbar load is transmitted to the tractor or truck frame. The hinge plate also has another laterally extending portion 37 on the opposite side from portion 35 which is adapted to bear against bearing block 38 when the fifth wheel 20 is in a lowered position as shown in Fig. 5.

When the apparatus of this invention is constructed in the foregoing manner, fifth wheel 20 can be raised and lowered while being maintained in a plane substantially parallel to the plane of the truck bed deck 14 and hence, the plane of the fifth wheel in a raised position will be parallel to that occupied when in a lowered position. As a result, the fifth wheel can be in an operative position when raised to receive the trailer connecting means and in a flush position with respect to the bed deck when in a lowered position.

A means for locking the trailer connecting means in a lowered or raised position can comprise a tie-bar or shaft 39 firmly connected to all of the hinge plates 25 at a position lateral from a line drawn between the axes of hinge pins 26 and 31. Disposed normal to shaft 39 at a point between its ends is a plate 40 having openings 41 and 42 therein which are disposed on an arc having as its radius the distance from said openings to the central axis of hinge pin 31 so that rotation of plate 40 through a slot in the plate 29 and between standards or locking lugs 43 will align openings 41 or 42 with corresponding openings in lugs 43. A pin 44 can be inserted through locking lugs 43 and through either hole 41 or 42 to lock the fifth wheel in a raised or lowered position, respectively. Shaft 39 serves not only as a support for plate 40 but also as a stiffening and aligning member to maintain hinge plates 25 in their respective correct positions.

In operation, when it is desired to use the truck or tractor in flush bed service, the fifth wheel is lowered to a position shown in Fig. 5 by removing pin 44 from its position in locking lugs 43 and then rotating fifth wheel 20 and pintle blocks 24 about the axis of lower pintle blocks 28 by pushing the fifth wheel forward until its upper surface is flush with the upper surface of truck bed deck 14. Pin 44 can then be reinserted through locking lugs 43 and hole 41 to lock the fifth wheel in its lowered position. In this manner the truck can be employed as a flush bed truck without the fifth wheel interfering with such service by projecting above the bed deck of the truck. Thus, loads can be skidded onto the truck with the truck winch without such load striking the fifth wheel. When it is desired to employ the truck or tractor as a means of pulling a trailer, it is only necessary that pin 44 be removed from locking lugs 43 and the fifth wheel pulled to a rearward position with respect to the truck frame such as is shown in Fig. 6 and the locking pin 44 reinserted through lugs 43 and opening 42 to lock the fifth wheel in its raised position. When the trailer has been attached to the fifth wheel in the conventional manner, the drawbar pull of the trailer will be transmitted by hinge plates 25 through the lower pintle blocks and the bearing blocks 36 to the frame of the truck. By reference to Figs. 5 and 6, it will be noted that the location of extended portions 35 and 37 relative to the lower pivot points of hinge plates 25 is such that when the fifth wheel is in its lowermost position, hinge pins 26 and extended portions 37, which engage bearing blocks 38, are both on one side of a vertical plane passing through hinge pins 31; and when the fifth wheel is in its raised position, hinge pins 26 and extended portions 35, which engage bearing blocks 36, are both on the other side of said vertical plane. Thus the fifth wheel and its load are positively supported and no stress will be placed on the locking pin 44 except by occasional forward thrusts.

It will be obvious to one skilled in the art from the foregoing that the above enumerated objects of the invention have been accomplished and that the advantages flowing therefrom will be readily secured. For example, the retractable trailer connecting means of this invention can be readily installed in an ordinary flat bed truck by merely cutting a suitable opening in the rear portion of the truck bed and then bolting the assembly of this invention in place, as shown in the drawings. The compactness and simplicity of the apparatus of this invention will permit such ready conversion and will not necessitate extensive rearrangement of the chassis and truck bed of an ordinary conventional flat bed truck. Also, the fifth wheel of the apparatus of this invention can be easily raised or lowered without resorting to extensive and complicated mechanical maneuvers or changes. When in a raised position, the fifth wheel is adapted to transmit the drawbar pull to the truck frame without undue strain thereon or on the parts pivotally connecting the fifth wheel to the truck frame.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for use in connecting a trailer to a tractor having a substantially horizontal bed deck, said apparatus comprising, in combination, a fifth wheel for receiving a connecting means attached to said trailer, linkage means pivotally connected to said tractor about an axis substantially parallel to said bed deck and connected to said fifth wheel for movement of said fifth wheel from a first position substantially level with said bed deck to a second position above said bed deck, the connection of said linkage means with said fifth wheel being disposed in the first position of the fifth wheel on one side of a plane passing through the axis of the pivotal connection of the linkage means and the tractor and perpendicular to said bed deck and being disposed in the second position of the fifth wheel on the other side of said plane, and bearing means on said tractor in position to be engaged by said linkage means in said first and second positions of the fifth wheel.

2. Apparatus of the character defined in claim 1, in which the linkage means is pivotally connected to the fifth wheel to permit said fifth wheel to be disposed parallel to the bed deck in said second position.

3. Apparatus of the character defined in claim 1, having means for locking said fifth wheel in said second position.

4. Apparatus for use in connecting a trailer to a tractor having a substantially horizontal bed deck, said apparatus comprising, in combination, a fifth wheel for receiving a connecting means attached to said trailer, rigid lever means pivotally connected toward one end to said tractor about an axis substantially parallel to said bed deck and pivotally connected toward its other end to said fifth wheel for movement of said fifth wheel between a first position substantially level with said bed deck and a second position above said bed deck, bearing parts on said tractor and lever means engageable with one another in said first position of the fifth wheel to prevent its pivotal movement in one directional sense and other bearing parts on said tractor and lever means engageable with one another in said second position of the fifth wheel to prevent its pivotal movement in the opposite directional sense, said bearing parts being arranged to dispose the connection of said lever means to said fifth wheel in the first position thereof on one side of a plane perpendicular to said bed deck and passing through the axis of the pivotal connection of said lever means to said tractor and to dispose said connection of the lever means to the fifth wheel in the second position thereof on the other side of said plane, and means for locking said fifth wheel in said positions, said locking means comprising, lug means mounted on said tractor, a plate carried by and movable with said lever means, and a pair of openings through one of the members of said locking means disposable, respectively, in alignment with an opening through the other of said members in the first and second positions of said fifth wheel, whereby a pin may be inserted through said aligned openings when so disposed.

5. Apparatus of the character defined in claim 4, in which said lever means comprises a pair of laterally spaced lever arms and said plate is carried from a shaft extending between and connected to said spaced lever arms.

References Cited in the file of this patent
UNITED STATES PATENTS

| Number | Name | Date |
|---|---|---|
| 2,515,575 | Van Langen | July 18, 1950 |